(12) United States Patent
Giles et al.

(10) Patent No.: US 12,014,109 B2
(45) Date of Patent: Jun. 18, 2024

(54) ADAPTIVE AUDIO OUTPUT

(71) Applicant: Apple Inc., Cupertino, CA (US)

(72) Inventors: Michael Giles, San Jose, CA (US); Baptiste Paquier, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/948,469

(22) Filed: Sep. 21, 2020

(65) Prior Publication Data
US 2021/0096811 A1  Apr. 1, 2021

Related U.S. Application Data

(60) Provisional application No. 62/906,454, filed on Sep. 26, 2019.

(51) Int. Cl.
*G06F 3/16* (2006.01)
*H04R 3/00* (2006.01)

(52) U.S. Cl.
CPC ............ *G06F 3/165* (2013.01); *H04R 3/00* (2013.01); *H04R 2420/07* (2013.01)

(58) Field of Classification Search
CPC ........ G06F 3/165; H04R 3/00; H04R 2420/07
See application file for complete search history.

(56) References Cited

U.S. PATENT DOCUMENTS

| | | | |
|---|---|---|---|
| 8,190,438 B1 | 5/2012 | Nelissen | |
| 10,039,074 B1 * | 7/2018 | Sargent | .................... G01S 5/28 |
| 2002/0137505 A1 * | 9/2002 | Eiche | .................. H04B 1/3877 |
| | | | 455/425 |
| 2009/0318197 A1 * | 12/2009 | Ron | ....................... H04W 4/50 |
| | | | 455/567 |
| 2012/0196571 A1 | 8/2012 | Grkov et al. | |
| 2012/0207329 A1 * | 8/2012 | Fried | ....................... H03G 3/32 |
| | | | 381/109 |
| 2014/0073262 A1 * | 3/2014 | Gutierrez | ............... G08B 13/22 |
| | | | 455/67.11 |
| 2016/0119753 A1 * | 4/2016 | Ostrander | ........... A61M 5/5086 |
| | | | 455/457 |
| 2016/0342379 A1 * | 11/2016 | Keipert | ................... G05B 15/02 |
| 2016/0373501 A1 | 12/2016 | Celinski et al. | |
| 2016/0373899 A1 | 12/2016 | Celinski et al. | |
| 2017/0201610 A1 * | 7/2017 | Motika | .................... G06F 3/165 |
| 2018/0091913 A1 * | 3/2018 | Hartung | ................... H03G 3/32 |
| 2018/0199138 A1 | 7/2018 | Dusan et al. | |
| 2019/0173687 A1 * | 6/2019 | MacKay | ........... H04L 29/08648 |
| 2019/0237092 A1 | 8/2019 | Norton et al. | |

FOREIGN PATENT DOCUMENTS

| | | |
|---|---|---|
| CN | 109151172 | 1/2019 |
| CN | 110096252 | 8/2019 |
| WO | 2014/126991 | 8/2014 |

\* cited by examiner

*Primary Examiner* — Joseph Saunders, Jr.
(74) *Attorney, Agent, or Firm* — Fay Kaplun & Marcin, LLP

(57) ABSTRACT

A device configured to generate audio output, receive an indication that a second device is to emit a signal, adjust the audio output from a first state to a second state based at least on the indication that the second device is to emit the signal, identify a predetermined condition and adjust the audio output from the second state to the first state based on at least the predetermined condition.

20 Claims, 6 Drawing Sheets

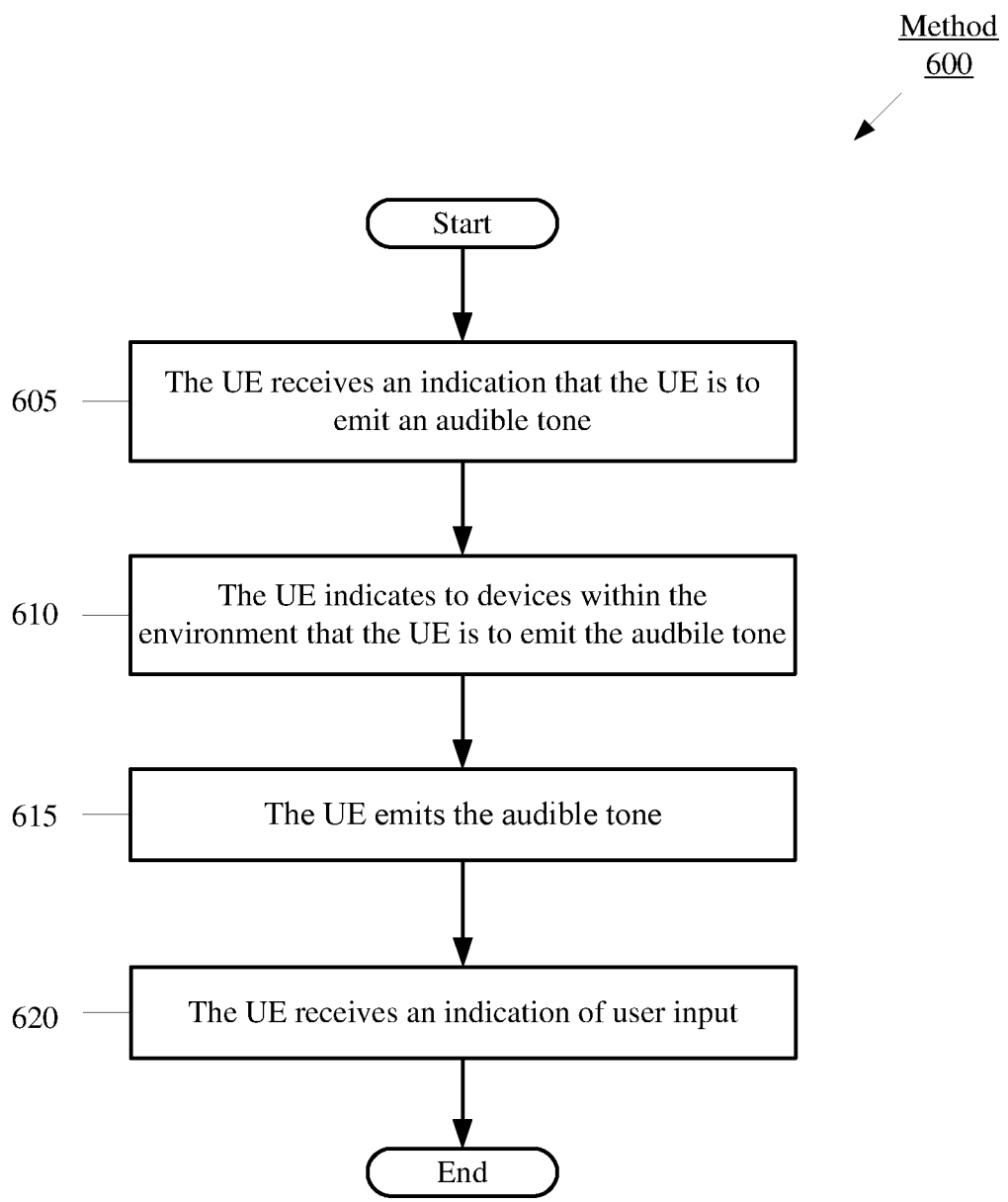

ADAPTIVE AUDIO OUTPUT

PRIORITY CLAIM/INCORPORATION BY REFERENCE

This application claims priority to U.S. Provisional Application Ser. No. 62/906,454 entitled "Adaptive Audio Output" and filed on Sep. 26, 2019, the entirety of which is incorporated herein by reference.

BACKGROUND

A user may possess multiple electronic devices. A first electronic device may be capable of triggering a second electronic device to emit an audible tone. The tone may be intended to aid the user in finding the second electronic device when the exact location of the second electronic device is unknown.

SUMMARY

Some exemplary embodiments are related to a method performed by a first device. The method includes generating audio output, receiving an indication that a second device is to emit a signal, adjusting the audio output from a first state to a second state based at least on the indication that the second device is to emit the signal, identifying a predetermined condition and adjusting the audio output from the second state to the first state based on at least the predetermined condition.

Other exemplary embodiments are related to a first device having a transceiver and a processor. The transceiver is configured to establish one of a network connection or a peer-to-peer connection. The processor is configured to perform operations. The operations include generating audio output, receiving an indication that a second device is to emit a signal, adjusting the audio output from a first state to a second state based on at least the indication that the second device is to emit the signal, identifying a predetermined condition and adjusting the audio output from the second state to the first state based on at least the predetermined condition.

Still further exemplary embodiments are related to a method performed by a first device. The method includes determining that the first device is to emit a first signal, transmitting a second signal that indicates to one or more other devices that the first device is to emit the first signal and emitting the first signal.

BRIEF DESCRIPTION OF THE DRAWINGS

FIG. 6 shows an exemplary method involving a UE configured to be triggered to emit a signal according to exemplary embodiments.

DETAILED DESCRIPTION

Figure 1:
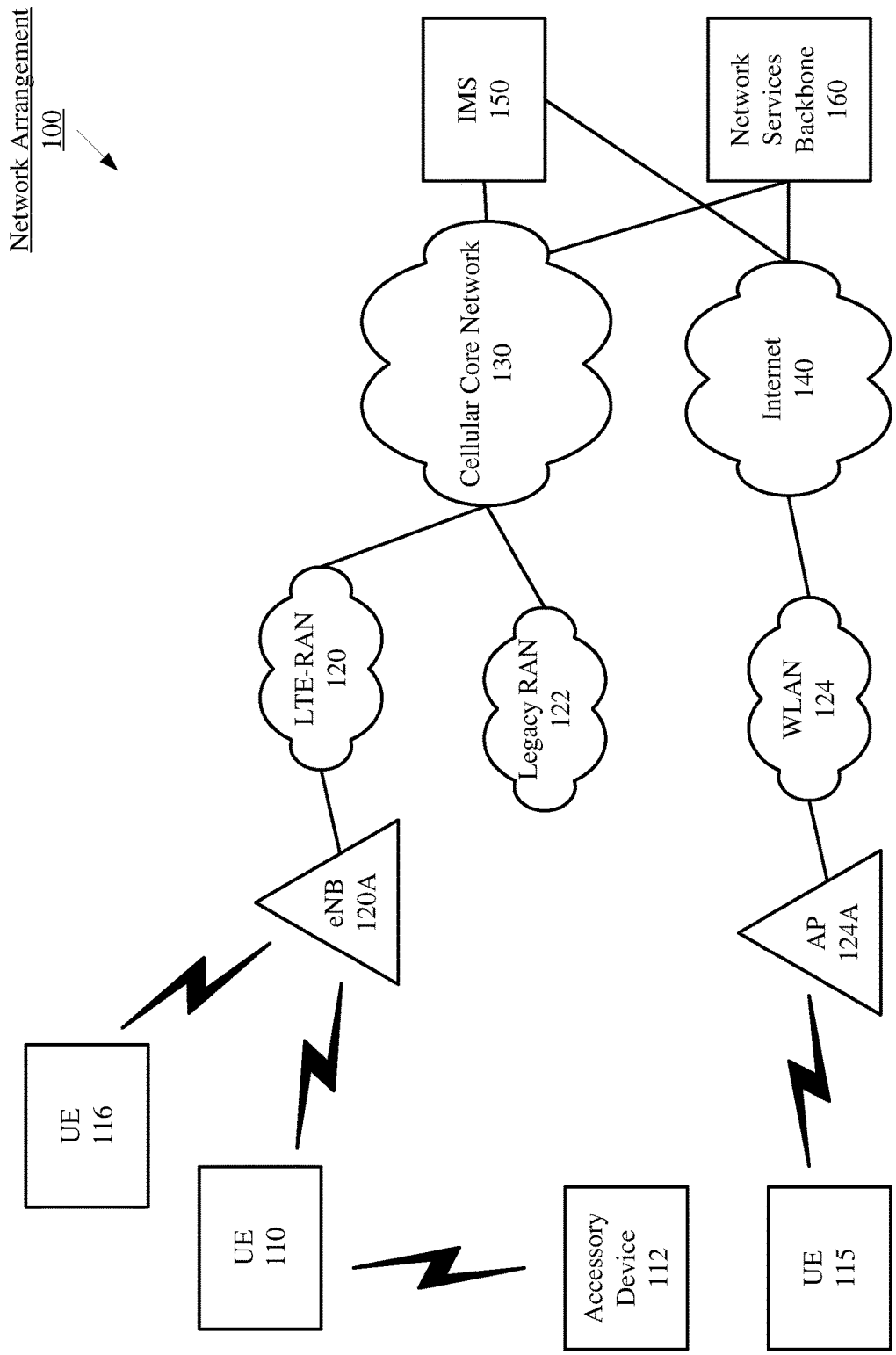
FIG. 1 shows an example network arrangement according to exemplary embodiments.

The exemplary embodiments may be further understood with reference to the following description and the related appended drawings, wherein like elements are provided with the same reference numerals. The exemplary embodiments describe devices, systems and methods for improving the user experience associated with managing the audio output generated by an electronic device, including when searching for another device. As will be described below, the exemplary embodiments relate to autonomously adapting the audio output of an electronic device in accordance with various different scenarios.

In certain scenarios, the user may be unable to perceive the tone emitted from a misplaced electronic device because one or more of the user's other electronic devices is generating audio output (e.g., streaming music, an active voice call, etc.). In some instances the tone may be a single sound, while in other instances the tone can be multiple sounds, e.g., characterized by multiple frequencies, patterns, amplitudes, volumes, etc. The tone also may be output for any duration, and may be constant or intermittent. The audio output may be played through one or more speakers or may be played through headphones, ear buds, etc. Under conventional circumstances, the user may have to manually adjust the audio output generated by the user's other electronic devices (e.g., lower the volume) to hear the tone emitted from the misplaced electronic device, e.g., during a location attempt. However, it may be inconvenient for the user to manually manage the audio output generated by the user's electronic devices when the user is searching for the misplaced electronic device. For example, the user may not want to interrupt an active voice call to listen for the tone generated by the misplaced electronic device. In another example, the electronic device generating the audio output may not be within reach of the user, e.g., when headphones or ear buds are being worn. Accordingly, there is a need for a mechanism that may autonomously manage the audio output generated by one or more of the user's electronic devices in a convenient manner.

The exemplary embodiments are described with regard to a UE. However, reference to a UE is merely provided for illustrative purposes. The exemplary embodiments may be utilized with any electronic device that may establish a connection to a network (including a peer-to-peer (P2P) network, a Personal Area Network (PAN), etc.) and is configured with the hardware, software, and/or firmware to exchange information (e.g., control information) and/or data with the network. Therefore, the UE as described herein is used to represent any suitable electronic device.

The UE may connect to an accessory device. Throughout this description, the term "accessory device" generally refers to an electronic device that is configured to connect to the UE. An accessory device also may be configured to generate audio output, including directly (e.g., through an integrated speaker) or indirectly. Further, the audio output may be in an audible range, an inaudible range, or both. By way of example, the accessory device may be headphones, one or more ear buds, a speaker, a wearable device, a further UE, a computing device, etc. The UE and the accessory device may communicate over a wireless and/or wired connection. However, any reference to the accessory device being a particular electronic device or the accessory device connecting to the UE in any particular manner is only provided for illustrative purposes. Therefore, the accessory device as described herein is used to represent any electronic component configured to connect to the UE and configured to generate, or cause to be generated, audio output.

The UE may perform an operation that causes the UE or its connected accessory device to generate audio output. There are a wide variety of operations that may cause the UE or its connected accessory device to generate audio output including, but not limited to, a voice call, a video call, streaming multimedia (e.g., audio, video, etc.), playing multimedia data stored on the UE, etc. However, any reference to the audio output being generated for any particular reason is merely provided for illustrative purposes. The exemplary embodiments apply to the UE or its connected accessory device generating audio output for any reason.

In a first aspect, the exemplary embodiments relate to adjusting the audio output generated by a UE or its connected accessory device in accordance with a sound being output by a different device. To provide an example, consider an exemplary scenario in which a first UE triggers a second UE (or any other device) to emit an audible tone. The tone may be intended to help the user find the second UE, e.g., when the location of the second UE is unknown. If the first UE is generating audio output (e.g., through associated headphones, ear buds, etc.) when the second UE is emitting the audible tone, the user may be unable (or less likely) to perceive the audible tone emitted by the second UE. Under conventional circumstances, the user may have to manually adjust the audio output generated by the first UE to hear the tone emitted by the second UE. However, this may be inconvenient for the user. For example, the audio output generated by the first UE may be the result of an active voice call and the user may not want to miss a portion of the voice call or explain to the participant on the remote end of the voice call that the user is currently looking for their misplaced device.

To provide another example, consider an exemplary scenario in which the first UE triggers the second UE to emit an audible tone while a third UE is streaming music. Thus, in this example, the user may be unable to perceive the audible tone emitted by the second UE because the third UE is generating audio output. Under conventional circumstances, the user may have to manually adjust the audio output generated by the third UE to hear the tone emitted by the second UE. However, this may be inconvenient for the user because the third UE may not be within the user's reach. As will be explained below, the exemplary embodiments provide a mechanism that is capable of autonomously adjusting the audio output generated by a UE or its connected accessory device in a manner that is convenient for the user.

In another aspect, the exemplary embodiments relate to receiving a signal at a first UE with a connected accessory device, where the signal is broadcast by another device (e.g., a second UE or different accessory device) and then performing an operation to notify/alert the user. For example, consider an exemplary scenario in which a first UE is connected to wireless headphones (e.g., the accessory device). Initially, the first UE triggers the second device to broadcast a signal. The signal may be intended to help find the second device. Subsequently, the first UE receives the signal broadcast by the second device and provides signals to the wireless headphones to generate audio output based on the received signal. In some instances, the audio output by the wireless headphones may be configured to be perceived as originating from the spatial direction in which the misplaced second device is located. Additionally or alternatively, in some implementations, the audio output may be modified (e.g., made softer/louder) to provide a sense of proximity (or range) to the second device. Thus, the exemplary embodiments implement a mechanism that is configured to capitalize on the capabilities of the UE's connected accessory device to improve the user experience associated with the user's various electronic devices.

In yet another example, a UE connected to an audio output device (e.g., ear buds, headphones, a speaker, etc.) can trigger a second device to output one or more audio signals, e.g., to assist in locating the second device. In conjunction with the triggering, the UE can modify an audio feed (e.g., stream, packets, etc.) being output by the audio output device to reduce interference with the one or more audio signals output from the second device. For instance, the audio feed can be modified by implementing a filter (e.g., high pass, low pass, notch, etc.) to eliminate or reduce a frequency or frequency range occupied by the one or more audio signals output by the second device. Additionally or alternatively, the UE or the audio output device can reduce the volume or mute the audio feed during a time period in which the one or more audio signals output by the second device are expected to be output or received. Any or all of these mechanisms can be implemented whether the second device outputs the one or more audio signals directly (e.g., through an integrated speaker) or indirectly (e.g. by sending the one or more audio signals to the UE for output by an audio output device associated with the UE).

In various embodiments, a first device (e.g., a UE, an accessory, a beacon, etc.) is sought using a second device. When the first and second devices are within an effective range, the first device can emit a signal that facilitates discovery. The signal can be an audible signal including one or more tones in one or more frequencies or an inaudible signal, such as a beacon message transmitted to the second device that can cause the second device to emit an audible signal. When the second device is generating audio output, the audio output can be modified to permit a user to perceive the audible signal associated with the first device. For example, audio output generated directly by the second device (e.g., through an integrated speaker) or indirectly by the second device (e.g., through headphones, one or more ear buds, or an external speaker) can be modified by muting, reducing the volume, or filtering at least a portion of the frequency range of the audio output. Modification of the audio output can be timed such that it at least partially overlaps with the signal emitted by the first device (or generated in response to an inaudible signal emitted by the first device), facilitating perception of the signal emitted (directly or indirectly) by the first device FIG. 1 shows a network arrangement 100 according to exemplary embodiments. The network arrangement 100 includes UEs 110, 115, 116. Those skilled in the art will understand that each of the UEs 110, 115, 116 may be any type of electronic device, such as an electronic device that is configured to communicate via a network (e.g., cellular, WLAN, P2P, D2D, PAN, etc.), e.g., mobile phones, laptop computers, desktop computers, smart speakers, smart TVs, set-top boxes, multimedia receivers, tablet computers, smartphones, phablets, embedded devices, wearable devices, beacon devices, Cat-M devices, Cat-M1 devices, MTC devices, eMTC devices, other types of Internet of Things (IoT) devices, etc. An actual network arrangement may include any number of UEs. Thus, the example of three UEs 110, 115, 116 is only provided for illustrative purposes.

Each of the UEs 110, 115, 116 may be configured to communicate directly with one or more networks. In the example of the network configuration 100, the networks with which the UEs 110, 115, 116 may wirelessly communicate with are a LTE radio access network (LTE-RAN) 120, a legacy radio access network (RAN) 122 and a wireless local access network (WLAN) 124. However, the UEs 110, 112 may also communicate with other types of networks (e.g., 5G new radio (NR), D2D, P2P, etc.) and the UEs 110, 115, 116 may also communicate with networks over a wired connection. Therefore, the UEs 110, 115, 116 may include an LTE chipset to communicate with the LTE-RAN 120, a legacy chipset to communicate with the legacy RAN 122 and an ISM chipset to communicate with the WLAN 124. The UEs 110, 115, 116 can include any number of radios, interfaces, and antennas for communicating via any desired number of networks, protocols, connections, etc.

Each of the UEs 110, 115, 116 may be configured to connect to one or more accessory devices. In this example, the UE 110 is connected to the accessory device 112. A person of ordinary skill in the art would understand that the accessory device 112 may be any type of electronic component configured to connect to the UE 110 and generate audio output, e.g., the accessory device may be headphones, ear buds, a speaker, a wearable device, a television, a set-top box, a further UE, etc. Thus, some types of accessory devices may also be configured to communicate with the one or more networks. A network arrangement may include any number of accessory devices connected to one or more UEs. Thus, the example of a single accessory device 112 is only provided for illustrative purposes.

The UE 110 and the accessory device 112 may communicate with one another without using the networks 120-124. For example, the UE 110 and the accessory device 112 may communicate with one another using a short-range communication protocol, such as a Bluetooth protocol (e.g., BT, BLE, etc.), WiFi Direct, UWB, Neighbor Awareness Networking (NAN), 5G sidelink (SL), etc. Thus, if the UE 110 and the accessory device 112 are proximate to one another (e.g., within a distance in which short-range communications may be performed), the UE 110 and the accessory device 112 may exchange data via a short-range connection. In one exemplary scenario, if the short-range communication protocol is being used, the UE 110 and the accessory device 112 may have a companion relationship where the UE 110 acts a source device, such as for audio data to be output by the accessory device 112. Thus, the accessory device 112 may be configured to wirelessly receive data utilizing only the short-range communication protocol, without connecting to any of the networks 120-124. In some such instances, the UE 110 may connect to one or more of the networks 120-124 and relay data exchanged with the one or more networks 120-124 to the accessory device 112 over the short-range communication pathway. The various UEs 110, 115 and 116 may also communicate with each other using a short-range communication protocol. Thus, any communications between the UEs 110, 115 and 116 that are described as occurring via one of the networks 120-124 may also be performed via an appropriate short-range communication protocol.

The LTE-RAN 120 and the legacy RAN 122 may be portions of cellular networks that may be deployed by cellular service providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

A person of ordinary skill in the art will understand that the WLAN 124 may include any type of wireless local area network (WiFi, Hot Spot, soft AP, IEEE 802.11 networks, etc.). WLANs may manage access to the network via any of a plurality of different hardware devices that are configured to send and/or receive traffic from UEs that are equipped with the appropriate WLAN chipset. In the exemplary network arrangement 100, the UE 115 may connect to the WLAN 124 via an access point (AP) 124A. A person of ordinary skill in the art would understand that any association procedure may be performed for the UE 115 to connect to the WLAN 124. However, reference to an AP is merely provided for illustrative purposes, an actual network arrangement may include any type of appropriate device that manages access to a WLAN.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110, 112 using the IP protocol. The IMS 150 may communicate with the cellular core network 130 and the Internet 140 to provide the multimedia services to the UEs 110, 112. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110, 115, 116 in communication with the various networks.

To provide some of the exemplary embodiments, consider a scenario that takes place within the example network arrangement 100. In this scenario, the UE 110 is connected to the accessory device 112 (e.g., ear buds) and the user is listening to music output by the accessory device 112. Further, the user is unaware of the location of the UE 115.

To assist in locating the UE 115, user input received at the UE 110 may trigger the UE 115 to output one or more audio signals. In conjunction with the triggering, the UE 110 and/or the accessory device 112 can modify the audio feed (e.g., stream, packets, etc.) being output by the accessory device 112 to reduce interference with the one or more audio signals output from the UE 115. For instance, the audio feed (e.g., the music) can be modified by implementing a filter to eliminate or reduce a frequency or frequency range occupied by the one or more audio signals output by the UE 115. This increases the likelihood that the user will be able to perceive the audio output of the UE 115. Additionally, the UE 110 and/or the accessory device 112 can reduce the volume of the audio feed (e.g., the music) being output by the accessory device 112 during a time period in which the one or more audio signals output by the UE 115 are expected to be output or received. Reducing the volume of the music being output by the accessory device 112 increases the likelihood that the user will be able to perceive the audio output by the UE 115.

In some embodiments, the UE 115 outputs the one or more audio signals directly (e.g., via a speaker). In other embodiments, the UE 115 sends one or more signals to the UE 110. In one example, the UE 115 may send a signal to the AP 124A and the UE 110 may receive the signal via the eNB 120A. In another example, the UE 115 may broadcast a signal via a short-range communication protocol. Subsequently, the UE 110 may cause the accessory device 112 to output audio based on the signal received from the UE 115 in a manner that allows the user to perceive the direction in which the UE 115 is located.

Figure 2:
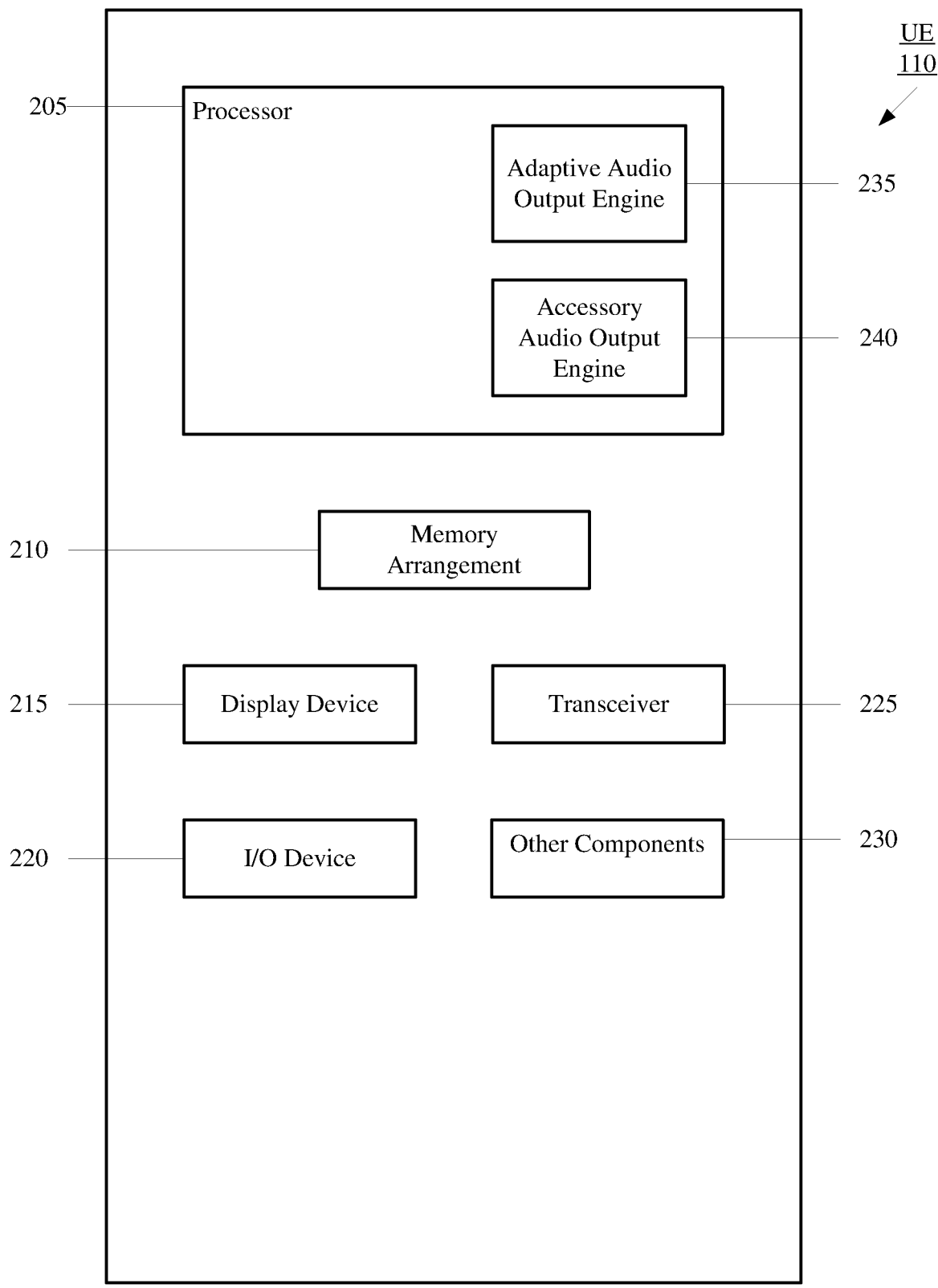
FIG. 2 shows an exemplary UE according to exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. A person of ordinary skill in the art would understand that the UE 110 may also represent the UEs 115, 116.

The processor 205 may be configured to execute a plurality of engines for the UE 110. For example, the engines may include an adaptive audio output engine 235 and an accessory audio output engine 240. The adaptive audio output engine 235 may monitor for predetermined conditions that may indicate that adjusting the audio output being generated by the UE 110 would improve the user experience for at least one of the UEs 115, 116 and the accessory device 112. The adaptive audio output engine 235 may adjust the settings corresponding to the audio output to increase the likelihood that, when identified or expected, a sound generated by another source can be perceived (e.g., the UE 115, the UE 116, the accessory device 112, a further accessory device, another person, etc.). In some implementations, this can be accomplished by one or more interference reduction mechanisms, such as reducing the volume of other audio output, muting other audio output, filtering one or more frequencies of the other audio output, etc. The interference reduction mechanism(s) can be initiated at or before the time the audio output from the other device is expected, and can be implemented for at least as long as the audio output from the other device is expected to last. Further, the accessory audio output engine 240 may configure the accessory device 240 to generate audio output that is to be perceived by the user as originating from a particular spatial direction.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the legacy RAN 122, the WLAN 124, etc. Accordingly, the transceiver 225 may operate on a variety of different frequencies or channels (e.g., set of consecutive frequencies).

Multiple devices may be associated with the same user account. For example, the UEs 110, 115, 116 and the accessory device 112 may be associated with the same user account. The user account may be identified by a user ID and one or more users may be permitted to access the same user account. For example, a family or business entity that consists of multiple users may each be permitted to access the same user account. The association between the devices and the user account may be stored and maintained on a server (e.g., a network component included within the network services backbone 160). Throughout this description, the server that stores associations between the user account and the devices will be referred to as the "account server." However, reference to the term account server is merely provided for illustrative purposes. The functionality described herein that is associated the account server may be performed by any appropriate type of one or more network components.

The account server may be provided by any entity or a set of entities. For example, the account server may be operated by the supplier of one or more of the UEs 110, 115, 116 or the accessory device 112. In another example, the account server may be operated by the cellular network provider. In a further example, the account server may be operated by a third party unrelated to the cellular network provider or the supplier of the UEs 110, 115, 116 or the accessory device 112.

The user may access their user account by providing credential information (e.g., user ID, password, fingerprint, voice, pin, etc.). In some embodiments, the user account may only be accessed via devices associated with the corresponding user account. In other embodiments, the user account may be accessed from any device including devices that are not associated with the user account.

By accessing the user account, the user may cause a signal to be sent to one of the devices associated with the user account that triggers the receiving device to perform a particular operation. In some embodiments, the account server sends the signal. In other embodiments, a different server (e.g., another network component included within the network services backbone 160) may send the signal. Thus, the user may trigger one device associated with the user account to perform an operation based on input entered at a different device. The exemplary embodiments are described with regard to the user triggering a remote device to generate audio output and/or broadcast a signal. However, a person of ordinary skill in the art would understand that the transmitted signal may be configured to cause the remote device to perform any of a variety of different operations.

Figure 3:
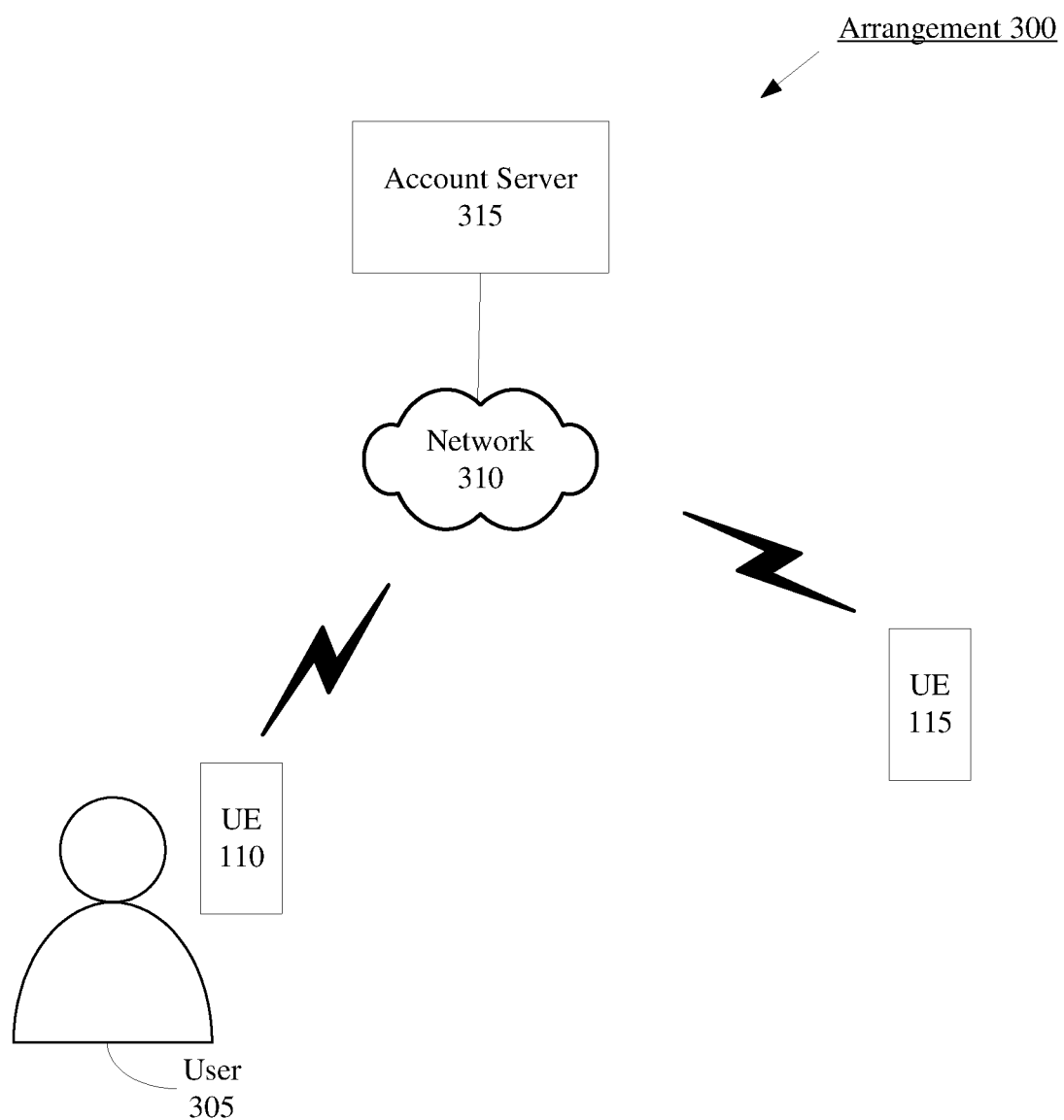
FIG. 3 shows an exemplary arrangement that includes a UE configured to adjust its audio output according to exemplary embodiments.

FIG. 3 shows an exemplary arrangement 300 that includes a UE 110 that is configured to adjust its audio output to increase the likelihood that a sound output by a different source can be perceived, e.g., by a user, according to various exemplary embodiments. The arrangement 300 will be described with regard to the network arrangement 100 of FIG. 1 and the UE 110 of FIG. 2.

The exemplary arrangement 300 depicts a user 305 that is in physical possession of the UE 110. In this example, at a first time, the UE 110 is performing an operation that causes the UE 110 to generate audio output. In this example, the audio output will be described as a voice call. However, this is only provided for illustrative purposes, the exemplary embodiments may apply to the UE 110 generating audio output for any appropriate reason. For example, the UE can be generating audio output data (e.g., packet, stream, etc.) associated with any type of operation or content (e.g., music playback, media playback, etc.).

The exemplary arrangement 300 also depicts the UE 115. The UE 115 belongs to the user 305. In this example, the user 305, the UE 110 and the UE 115 are described as being within the user's 305 home. However, the user 305 does not know where within their home the UE 115 is located. Reference to the user's 305 home is only provided for illustrative purposes, the exemplary embodiments may apply to any type of location.

The UE 110 and the UE 115 are connected to the network 310. In this example, the network 310 may include the LTE-RAN 120 and the WLAN 124 of FIG. 1. Thus, the UE 110 may be currently camped on the eNB 120A and the UE 115 may be connected to the AP 124A. However, as indicated above, the exemplary embodiments are not limited to any particular type of network connection and the UEs 110, 115 may be connected to any appropriate network.

An account server 315 may also be connected to the network 310. The account server 315 stores and maintains associations between devices and their corresponding user accounts. In this example, the UE 110 and the UE 115 are associated with the same user account. As mentioned above, any number of users and devices (e.g., UEs and accessory devices) may be associated with the same user account. Thus, reference to a single user 305 and two UEs 110, 115 is only provided for illustrative purposes.

As mentioned above, at the first time, the UE 110 is currently generating audio output for a voice call and the location of the UE 115 is unknown. During the voice call, the user 305 wants to reference a file stored on the UE 115. However, the user 305 cannot remember where the UE 115 is located. Thus, the user 305 enters user input at the UE 110 that is intended to trigger the UE 115 to emit an audible tone. Initially, the user input may trigger a first signal to be sent to the account server 315 via the network 310. In response, the account server 315 sends a second signal to the UE 115 via the network 310. The second signal may trigger the UE 115 to emit an audible tone that is intended to aid the user 305 in finding the UE 115. Reference to an audible tone is merely provided for illustrative purposes and is not intended to limit the exemplary embodiments to any particular type of audio output.

Since the voice call is occurring while the user 305 is looking for the UE 115, under conventional circumstances, the audio output generated by the UE 110 for the voice call may impede the user's 305 perception of the audible tone emitted by the UE 115. However, the user 305 may also not want to interrupt or miss portions of the voice call. As will be explained below, the UE 110 may implement any of a variety of techniques that are configured to adapt the audio output generated by the UE 110 to this scenario.

The UE 110 may be equipped with various techniques that are configured to adjust the audio output generated by the UE 110 to the current conditions. The technique(s) selected by the UE 110 may be based on factors such as, but not limited to, the type of operation that is causing the UE 110 to generate the audio output, information received from the account server 315, user-selected settings, information received over a network connection, etc. Thus, one or more different techniques may be implemented depending on the type of conditions that are present.

A first technique may include reducing the volume of the audio output by a predetermined value (e.g., a number of decibels (dB), a scale specific to the UE 110, etc.). In some embodiments, the first technique may be configured to implement a gradual adjustment to the volume until the predetermined value is reached (e.g., ducking). In other embodiments, the first technique may be configured to implement an instantaneous adjustment. A second technique may include muting the audio output or pausing/stopping the operation that is causing the UE 110 to generate the audio output. Like the first technique, the second technique may be implemented as either a gradual adjustment or an instantaneous adjustment.

A third technique may include implementing a notch or filter in the frequency range of the audio output. For example, the UE 110 may be capable of generating audio output within a first frequency range of 20-20,000 hertz (Hz). The UE 110 may apply one or more filters to the audio output such that at least a second frequency range that is a subset of the first frequency range is prevented from being output by the UE 110. The second frequency range may be the same as, or at least a portion of, the frequency range of the audible tone (or tones) emitted by the UE 115, or may extend beyond the frequency range of the audible tone emitted by the UE 115, e.g., by some margin on either or both ends of the frequency range. Further, the technique can be implemented continuously for a duration, or intermittently in accordance with a period corresponding to when the audible tone is expected to be emitted by the UE 115. Thus, by implementing the notch or filter in the audio output at the UE 110 that is based on the audible tone that is to be emitted by the UE 115, the user 305 may have a higher likelihood of perceiving the tone emitted by the UE 115 because it may be the only, or most prominent, source of sound within that frequency range in the vicinity of the user 305.

Once the user finds the UE 115, the user 305 may enter user input at either the UE 115 or the UE 110 to return the UE 110 to generating the audio output in accordance with the settings that were in effect before the selected technique(s) was implemented. Thus, at the first time, audio output generated by the UE 110 may possess a first set of characteristics (e.g., volume, frequency, etc.). At a second time, after at least one of the above referenced techniques is implemented, audio output may be generated by the UE 110 that may possess a second set of characteristics. At a third time, after the user 305 finds the UE 115, audio generated by the UE 110 may once again possess the first set of characteristics.

Figure 4:
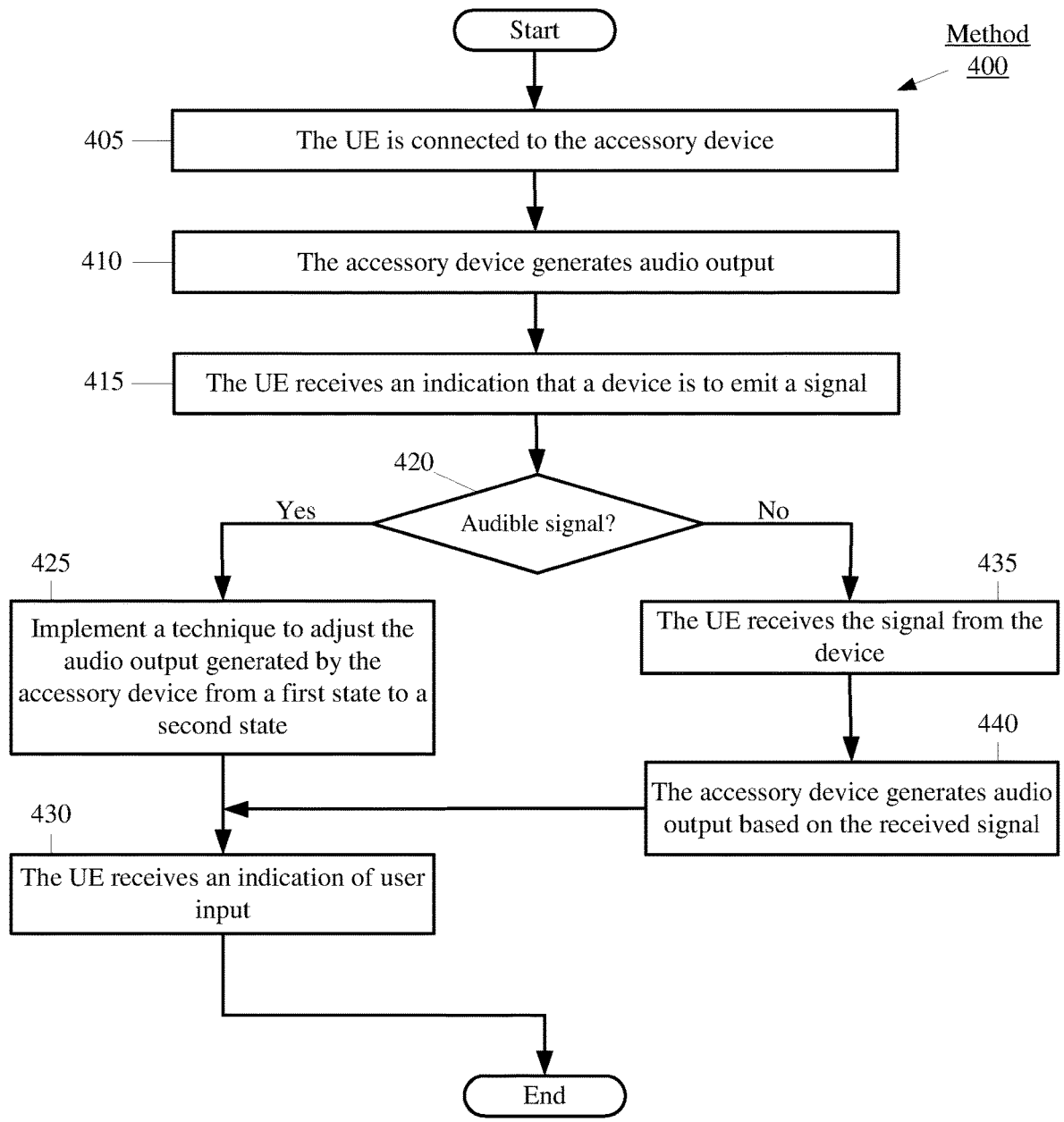
FIG. 4 shows an exemplary method involving a UE configured to adjust its audio output according to exemplary embodiments.

FIG. 4 shows an exemplary method 400 for a UE 110 that is configured to adjust its audio output when the UE 110 is connected to an accessory device 112 according to various exemplary embodiments. The method 400 will be described with regard to the network arrangement 100 of FIG. 1 and the UE 110 of FIG. 2.

In 405, the UE 110 is connected to the accessory device 112. In this example, the accessory device 112 will be described as wireless headphones. Thus, the UE 110 and the accessory device 112 communicate with one another using a short-range communication protocol such as Bluetooth.

In 410, the accessory device 112 generates audio output. For example, the user may be participating in a voice call. Thus, the UE 110 may receive data for the voice call via its currently camped cell. The UE 110 may then forward audio data to the accessory device 112 via the short-range communication protocol. Audio output is then generated by the accessory device 112.

In 415, the UE 110 receives an indication that a separate device is to emit a signal. In the example, the device will be described as the UE 115. However, this is only for illustrative purposes, the UE 110 may also receive an indication that an accessory device or any other type of electronic device is to emit a signal. As will be described below, the signal that is to be emitted may be an audible signal that is intended to be perceived by a human or may be a signal that is intended to be received and processed by an electronic device, e.g., for audible output.

The indication in 415 may be received from any of a variety of different sources. For example, the indication may be user input entered at the UE 110. The user input may be associated with a request to cause the UE 115 to emit the signal. In some embodiments, the indication may be received from the account server over the network connection. For example, the UE 115 may communicate with the account server regarding the signal that is to be emitted. The account server may then indicate to the UE 110 that the signal is to be emitted by the UE 115. In other embodiments, the UE 110 may receive the indication over a short-range communication protocol. For example, prior to emitting the signal, the UE 115 may broadcast a beacon. The beacon may be received by the UE 110 directly from the UE 115. In some embodiments, another device within the environment may relay the beacon or information included within the beacon to the UE 110. In a further embodiment, the UE 110 may receive the indication over the network connection. For example, both the UE 110 and the UE 115 may have a connection to a WLAN. Thus, the UE 115 may send the indication to the UE 110 over the WLAN.

Like the example provided above for the exemplary arrangement 300, the signal that is to be emitted by the UE 115 may be an audible tone (or tones) that is intended to help the user in finding the device emitting the tone. However, the exemplary embodiments are not limited to an audible tone that is intended to help the user find the corresponding device. The indication in 415, may be for any type of impending audio output that is intended for any appropriate purpose.

In some embodiments, the indication in 405 is for an alert that a timer has expired. For example, UE 115 may be an IoT device (e.g., an appliance or piece of equipment). During operation of the UE 115, the user may set a timer. Thus, the UE 110 may receive an indication that the timer set on the UE 115 is to expire or has expired. In other embodiments, the audio output may be a scheduled voice notification. For example, the UE 115 may be a smart speaker. The user may request that the UE 115 announce a notification at a scheduled time. In a further embodiment, the audio output may be emitted from a wearable device based on a predetermined condition. For example, the UE 115 may be a wearable fitness related device and the user may set the UE 115 to generate audio output when the user travels a certain distance.

As mentioned above, the signal that is to be emitted may not be an audible signal. Instead, the signal that is to be emitted may be a signal that is intended to be received and processed by the UE 110. For instance, the signal may include information and/or data that is intended to be used by the UE 110 to generate audio output at the UE 110 or its connected accessory device 112.

In 420, the UE 110 determines whether the signal that is to be emitted by the UE 115 is to be an audible signal. The UE 110 may make this determination based on a variety of different factors including, but not limited to, the indication received in 415, information received from the account server, preconfigured settings, etc.

If the signal to be emitted is determined to be an audible signal, the method 400 continues to 425. In 425, the UE 110 may implement a technique to adjust the audio output generated by the UE 110 from a first state to a second state to increase the likelihood that the user is able to hear the audible signal emitted by the UE 115. The techniques described above for the exemplary arrangement 300 may also apply when the accessory device 112 is the device that is generating the audio output for the user. Accordingly, as mentioned above, these techniques may include lowering the volume of the audio output, muting the audio output, pausing/stopping the operation generating the audio output. The adjustment may occur in a gradual or instantaneous manner. Further, like the example provided for the exemplary arrangement 300, the implemented technique may include placing a notch in the frequency range output by the accessory device 112 that is based on the frequency range of the signal that is to be emitted by the UE 110.

Another technique may include toggling a transparency setting for the accessory device 112. The transparency setting may correspond to a mode of operation where the accessory device cancels or reduces the external sounds that may be perceived by the user. Thus, if the transparency setting is causing the accessory device 112 to actively cancel or reduce the external sounds, the transparency setting may be adjusted to enable the user to perceive external sounds and thus, the audible tone emitted by the UE 115. A person of ordinary skill in the art would understand the operations and mechanisms that may be performed by the accessory device 112 to cancel or reduce external sounds.

One or more techniques may be selected based on any of a variety of factors. These factors may include but are not limited to, the type of audio output generated by the UE 110, information included in the indication received in 415, the settings of the UE 110 or its accessory device (e.g., transparency setting toggled on, high volume, etc.), information received from the account server, information received over a network connection, information received from other applications running on the UE 110, information collected from sensors included within the UE 110, measurement data collected by the UE 110, user input, preconfigured settings, etc. For example, if the audio output is for a voice call it may be impractical to mute the corresponding audio output or to pause/stop the voice call. Instead, the technique implemented may be to gradually lower the volume. In another example, if the audio output is for streaming music the user may prefer to mute the corresponding audio output or to pause/stop the music instead of just lowering the volume.

In 430, the UE 110 may receive an indication of user input. The user input may indicate that the audio output generated by the UE 110 is to return to the first state. The user input may also indicate that the UE 115 is to stop emitting the signal. For example, when the user finds the UE 115 the user may enter user input at either the UE 110 or the UE 115. Subsequently, the user input may trigger the UE 115 to stop emitting the signal and the UE 110 to adjust the audio output generated for the voice call from the second state back to the first state. If the user input occurs at the UE 110, the UE 110 may send a signal directly to the UE 115 (e.g., over the network, a beacon, etc.) indicating that the UE 115 should stop emitting the audible tone. In other embodiments, the UE 110 may send the signal to the account server and the account server may send a signal to the UE 115 indicating that the UE 115 should stop emitting the audible tone. Similarly, if the user input occurs at the UE 115, the UE 115 may send a signal directly to the UE 110 (e.g., over the network, a beacon, etc.) indicating that the UE 110 should adjust the audio output from the second state back to the first state. In other embodiments, the UE 115 may send the signal to the account server and the account server may send a signal to the UE 110 indicating that the UE 110 should adjust the audio output from the second state back to the first state. Subsequently, the method 400 ends.

User input is not the only indication that may be used to indicate that the audio output generated by the UE 110 is to return to the first state and that the UE 115 is to stop emitting the signal. In other embodiments, a timer may be used to provide this type of indication. For example, the UE 110 may set a timer to a predetermined duration when the indication that another device is to emit a signal is received in 415. Upon the expiration of the timer, the UE 110 may adjust the audio output from the second state back to the first state. This ensures that the user will not have to experience the audio output in the second state for an unreasonable amount of time. The UE 115 may initiate a similar timer. This ensures that the UE 115 will not emit the signal for an unreasonable amount of time. In other embodiments the account server may initiate a timer. Upon expiration of the timer, the account server may indicate to the UE 110 to return the audio output to the first state and may indicate to the UE 115 to stop emitting the signal.

The location of the UEs 110, 115 may also indicate that the audio output generated by the UE 110 is to return to the first state and that the UE 115 is to stop emitting the signal. For example, the UE 110 may determine that the UE 115 is within a predetermined distance relative to the UE 110 (e.g., 6 inches, 2 feet, 4 feet, 7 feet, 10 feet, etc.). Since the UEs 110, 115 are within the vicinity of one another it may not be necessary to continue generating the audio output in the second state. Subsequently, the UE 110 may signal the UE 115 directly or via the account server to trigger the UE 115 to stop emitting the signal. This example was described with regard to the UE 110 making this determination, however, the UE 115 may also be capable of determining that the UE 110 is within the predetermined distance. In some embodiments, the account server may make this determination based on information received from the UE 110 and the UE 115. Subsequently, the account server may signal the UE 110 to adjust the audio output back to the first state and the UE 115 to stop emitting the signal.

Therefore, user input is not the only indication that may be used in 430. The exemplary embodiments may apply to any of the UEs 110, 115 or the account server identifying any type of predetermined condition (e.g., user input, a received signal, the expiration of a timer, location, etc.) in 430.

Returning to 420, if the signal to be emitted is determined to be a signal that is to be received and processed by the UE 110, the method 400 continues to 435. In 435, the UE 110 receives the signal broadcast by the UE 115. The UE 110 may receive this signal directly from the UE 115 (e.g., over the network connection, a beacon over short-range communication protocol, a frequency, etc.). Alternatively, the account server may facilitate the communications between the UE 110 and the UE 115.

The indication in 415 may include information regarding how the signal in 435 is to be broadcast. This allows the UE 110 to configure its hardware, software and/or firmware to receive the signal and identify the signal from the UE 115. For example, the signal may indicate to the UE 110 which radio to tune (e.g., LTE, WiFi, Bluetooth, ISM, etc.), the type of filter to utilize, what type of information or indication to monitor for, etc.

In 440, the accessory device 112 generates audio output based on the received signal. For example, the signal may be intended to help the user find the location of the UE 115. When the UE 110 receives the signal, the UE 110 and/or the accessory device 112 may configure a tone to be perceived as originating from the spatial direction of the UE 115. Thus, the user may hear a tone through the accessory device 112 but other people will not hear the UE 115 generating any audible output. As the user changes their location and orientation, the tone generated by the accessory device 112 may change to reflect the user's new location/orientation relative to the UE 115. As mentioned above, reference to the signal broadcast by the UE 115 being used for this purpose is only provided as an example. In other embodiments, the signal broadcast by the UE 115 may be to alert the user of the expiration of a timer, a scheduled notification/reminder, a predetermined condition, or any other appropriate purpose.

The UE 110 may insert audio data for the tone in the data stream being sent to the accessory device 112. Thus, from the user perspective, the accessory device 112 will generate audio output that includes the voice call and the tone. Further, the audio output generated in 410 may also be adjusted from a first state to a second state using the techniques described above with regard to 425. For example, a notch may be implemented in the frequency for the voice call or the volume of the voice call may be lowered. The method 400 then continues to 430. In 430, the UE 110 may receive an indication of user input. Subsequently, the method 400 ends.

In the method 400, the UE 115 was described as being the source of the audible tone. However, the exemplary embodiments may also apply to adjusting the audio output generated by the accessory device 112 to increase the likelihood that the user is able to hear portions of an in-person conversation. For example, the user may be using the UE 110 and the accessory device 112 to stream music. The user may be walking and carrying items. Thus, the user may be unable to manually adjust audio output being generated by the accessory device 112.

Accordingly, the UE 110 and/or the accessory device 112 may be configured to identify that the user is participating in a conversation. The user talking may be identified based on various factors including but not limited to, volume of audio input received via a microphone included in the accessory device 112, the direction of audio input received via a microphone included in the accessory device 112, measurement data collected by sensors and/or components of the accessory device 112 or the UE 110. In some embodiments, based on this indication, a technique may be implemented that may increase the likelihood of the user being able to perceive the in-person conversation. For example, the volume of the music may be lowered, or the music may be paused. Thus, based on identifying that the user is talking or participating in an in-person conversation, the audio output generated by the accessory device 112 may be adjusted from a first state to a second state. Subsequently, if no indication of the in-person conversation is identified for the predetermined amount of time, the audio output generated by the accessory device 112 may return to the first state.

The method 400 was described with regard to the UE 110 generating audio output when the signal is received from the UE 115. However, the exemplary embodiments are not limited to scenarios in which a voice call or another type of audio output is being generated when the signal is received from the UE 115. For instance, 435-440 may be performed without the audio output of 410. Thus, the user may look for the UE 115 by following the perceived direction tone being output by the accessory device 112 in a noisy environment. This also prevents the UE 115 from disrupting its surrounding environment with an audible tone.

Figure 5:
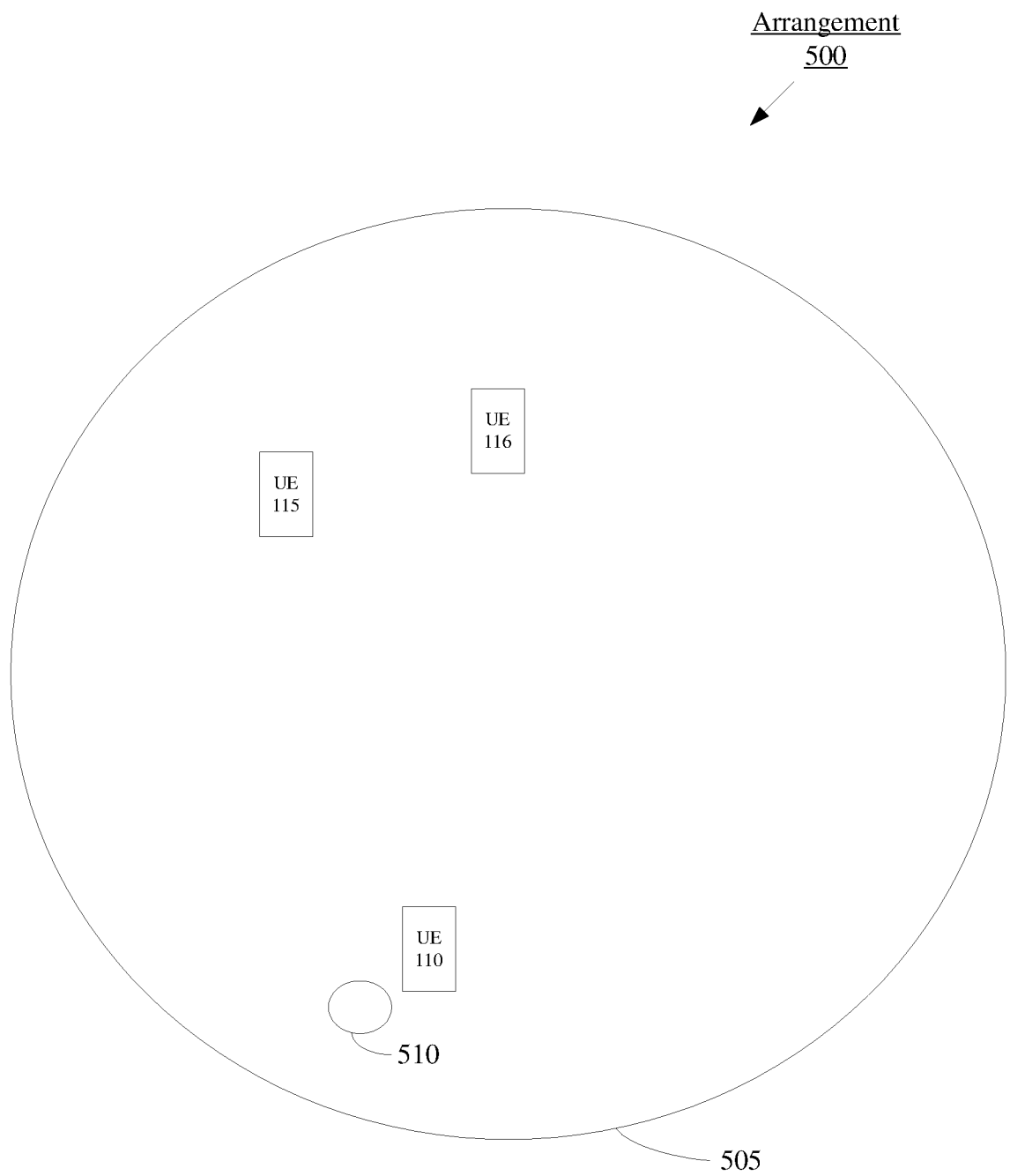
FIG. 5 shows an exemplary arrangement including three UEs according to exemplary embodiments.

FIG. 5 shows an exemplary arrangement 500 that includes three UEs 110, 115, 116 according to various exemplary embodiments. The arrangement 500 will be described with regard to the network arrangement 100 of FIG. 1 and the UE 110 of FIG. 2.

As indicated above, the user may be associated with multiple UEs. For example, the user environment 505 may include the user 510, the UE 110, the UE 115 and the UE 116. Consider a similar scenario to the example described above with regard to the exemplary arrangement 300. The user 510 may be in physical possession of the UE 110 and participating in a voice call. The location of the UE 115 within the environment 505 is unknown. However, unlike the example described with regard to the exemplary arrangement 300, the exemplary arrangement 500 includes the UE 116. In this example, the UE 116 is a smart speaker being used to stream music. Thus, there are multiple sources of audio output that may impede the user from perceiving the audible tone emitted by the UE 115. Accordingly, as will be described below with regard to the method 600, the exemplary embodiments may also adjust the audio output generated by the UE 116 to increase the likelihood that the user 510 is able to hear the tone emitted by the UE 115.

FIG. 6 shows an exemplary method 600 for a UE 115 that is configured to be triggered to emit a signal. The method 600 will be described with regard to the network arrangement 100 of FIG. 1, the UE 110 of FIG. 2 and the exemplary arrangement 500 of FIG. 5.

In 605, the UE 115 receives an indication that the UE 115 is to emit an audible tone. As mentioned above with regard to the exemplary arrangement 500, the audible tone is intended to help the user find the UE 115. However, as mentioned above, the exemplary embodiments are not limited to emitting an audible tone for this purpose. The UE 115 may be triggered to emit an audible tone or a signal that is to be received and processed by one or more electronic devices (e.g., UE 110, UE 116) for any appropriate purpose.

In some embodiments, the indication may be received directly from the UE 110 over the network connection or via a short-range communication protocol. In other embodiments, the signal may be received from the account server. In still further embodiments, the indication may be received based on user input at the UE 115. For example, the UE 115 may be scheduled to emit the signal at a particular time or upon the occurrence of a predetermined condition.

In 610, the UE 115 indicates to devices within the user environment 505 that the UE 115 is to emit the audible tone. For example, the UE 115 may broadcast a beacon over a short-range communication protocol, communicate with other devices over the network connection (e.g., WLAN 124) or request that the account server provide the indication to the other devices associated with the user account and/or within the user environment 505.

In this example, the user environment 505 also includes the UE 110 and the UE 116. Thus, the UE 110 may receive this indication and subsequently, implement a technique that is to adjust audio output generating by the UE 110. Accordingly, the UE 115 may adjust its audio output from a first state to a second state based on the indication. The UE 116 may also receive this indication. Thus, the UE 116 may also implement a technique to adjust its audio output (e.g., lower the volume, mute the audio output, pause the operation generating the audio output, implement a notch in the frequency range of the audio output, a combination thereof, etc.). Accordingly, the UE 116 may adjust its audio output from a first state to a second state based on the indication.

In 615, the UE 115 emits the audible tone. Based on the audible tone the user 510 may find the UE 115. In 620, the UE 115 receives an indication of user input. The user input may indicate that the audio output generated by the UE 110 is to return to the first state, the audio output generated by the UE 116 is to return to the first state and the UE 115 is to stop emitting the audible tone. For example, when the user finds the UE 115, the user may enter user input at any of the UEs 110, 115, 116. Subsequently, the user input may trigger the UE 115 to stop emitting the signal, the UE 110 to adjust the audio output generated for the voice call from the second state back to the first state and the UE 116 to adjust the audio output generated for the music from the second state back to the first state.

If the user input occurs at the UE 110, the UE 110 may send a signal directly to the UEs 115, 116 (e.g., over the network, a beacon, etc.) indicating that the UE 115 should stop emitting the audible tone and the audio output generated by the UE 116 is to return to the first state. In other embodiments, the UE 110 may send the signal to the account server and the account server may send a signal to the UEs 115, 116. Similarly, if the user input occurs at the UE 115, the UE 115 may send a signal directly to the UEs 110, 116 (e.g., over the network, a beacon, etc.) indicating that the UE 110 should adjust the audio output from the second state back to the first state and the audio output generated by the UE 116 is to return to the first state. In other embodiments, the UE 115 may send the signal to the account server and the account server may send a signal to the UEs 110, 116. If the user input occurs at the UE 116, the UE 116 may send a signal directly to the UEs 110, 115 (e.g., over the network, a beacon, etc.) indicating that the UE 115 should stop emitting the audible tone and the audio output generated by the UE 110 is to return to the first state. In other embodiments, the UE 116 may send the signal to the account server and the account server may send a signal to the UEs 115, 110. Subsequently, the method 600 ends.

Like in 430 of the method 400, user input is not the only indication that may be used in 620 The exemplary embodiments may apply to any of the UEs 110, 115 or the account server identifying any type of predetermined condition (e.g., user input, a received signal, the expiration of a timer, location, etc.) in 620.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to track the location of a user and/or their associated devices. Accordingly, use of such personal information data improves the user experience by enabling a user to utilize a first device to find the location of a second device.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain device tracking related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, determining the location of a device may be based on aggregated non-personal information data or a bare minimum amount of personal information, such as the information associated with the location of the user and/or being maintained only on the user's device.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
    at a first device:
        generating audio output;
        receiving an indication that a second device is to emit a signal;
        adjusting the audio output from a first state to a second state based at least on receiving the indication that the second device is to emit the signal and the type of audio output;
        receiving the signal emitted by the second device;
        generating further audio output based on the received signal, wherein the further audio output is configured to indicate a location of the second device;
        identifying a predetermined condition; and
        adjusting the audio output from the second state to the first state based on at least the predetermined condition.

2. The method of claim 1, wherein adjusting the audio output from the first state to the second state comprises adjusting a volume parameter for the audio output from a first value to a second value.

3. The method of claim 1, wherein adjusting the audio output from the first state to the second state comprises muting the audio output.

4. The method of claim 1, wherein adjusting the audio output from the first state to the second state comprises preventing the audio output from including a frequency range.

5. The method of claim 4, wherein the frequency range is based on at least the signal the second device is to emit.

6. The method of claim 1, wherein generating audio output includes transmitting audio data to an accessory device via a short-range communication protocol.

7. The method of claim 6, wherein the audio data transmitted to the accessory device configures the accessory device to adjust an accessory device audio output from the first state to the second state, wherein the accessory device is a different device from the first device and the second device.

8. The method of claim 6, wherein the accessory device is wireless headphones.

9. The method of claim 1, wherein the predetermined condition is based on an indication of user input, wherein the user input is received at one of the first device or the second device.

10. The method of claim 1, wherein the predetermined condition is based on one or more of a location of the first device, a location of the second device, or a timer.

11. The method of claim 1, wherein generating the further audio output comprises modifying a volume parameter of the further audio output based on a proximity of the first device to the second device.

12. The method of claim 1, wherein the first device and the second device are associated with a same user account.

13. A first device, comprising:
a transceiver configured to establish one of a network connection or a peer-to-peer connection; and
a processor configured to perform operations comprising:
generating audio output;
receiving an indication that a second device is to emit a signal;
adjusting the audio output from a first state to a second state based at least on receiving the indication that the second device is to emit the signal and the type of audio output;
receiving the signal emitted by the second device;
generating further audio output based on the received signal, wherein the further audio output is configured to indicate a location of the second device;
identifying a predetermined condition; and
adjusting the audio output from the second state to the first state based on the predetermined condition.

14. The first device of claim 13, wherein adjusting the audio output from the first state to the second state comprises one of i) adjusting a volume parameter for the audio output from a first value to a second value or ii) muting the audio output.

15. The first device of claim 13, wherein adjusting the audio output from the first state to the second state comprises preventing the audio output from including a frequency range and wherein the frequency range is based at least on the signal the second device is to emit.

16. The first device of claim 13, wherein the predetermined condition is based on at least an indication of user input and wherein the user input is received at one of the first device or the second device.

17. The first device of claim 13, wherein generating audio output includes transmitting audio data to an accessory device via a short-range communication protocol.

18. The first device of claim 17, wherein the audio data transmitted to the accessory device configures the accessory device to adjust an accessory device audio output from the first state to the second state, wherein the accessory device is a different device from the first device and the second device.

19. The first device of claim 17, wherein the accessory device is wireless headphones.

20. The first device of claim 13, wherein generating the further audio output comprises modifying a volume parameter of the further audio output based on a proximity of the first device to the second device.

* * * * *